US012615228B2

(12) United States Patent
Fujisaki

(10) Patent No.: US 12,615,228 B2
(45) Date of Patent: Apr. 28, 2026

(54) INFORMATION PROCESSING SYSTEM RECEIVING AND SENDING FILE WITH TIMESTAMP INCLUDING HASH VALUE

(71) Applicant: HEARTBEATS CORPORATION, Tokyo (JP)

(72) Inventor: Masanori Fujisaki, Tokyo (JP)

(73) Assignee: HEARTBEATS CORPORATION (JP)

( * ) Notice: Subject to any disclaimer, the term of this patent is extended or adjusted under 35 U.S.C. 154(b) by 5 days.

(21) Appl. No.: 18/713,360

(22) PCT Filed: Jan. 6, 2023

(86) PCT No.: PCT/JP2023/000223
§ 371 (c)(1),
(2) Date: May 24, 2024

(87) PCT Pub. No.: WO2023/140128
PCT Pub. Date: Jul. 27, 2023

(65) Prior Publication Data
US 2025/0055822 A1     Feb. 13, 2025

(30) Foreign Application Priority Data
Jan. 20, 2022     (JP) ................................ 2022-007388

(51) Int. Cl.
*H04L 51/08*     (2022.01)
*H04L 67/06*     (2022.01)

(52) U.S. Cl.
CPC .............. *H04L 51/08* (2013.01); *H04L 67/06* (2013.01)

(58) Field of Classification Search
CPC ......... H04L 51/00; H04L 51/07; H04L 51/08; H04L 67/06
See application file for complete search history.

(56) References Cited

U.S. PATENT DOCUMENTS 11,582,044 B2 *   2/2023  Zabetian ............... H04L 9/3297
12,072,837 B2 *   8/2024  Specht .................. G06F 16/113
(Continued)

FOREIGN PATENT DOCUMENTS

GB          2584455  A      12/2020
JP      2016-170643  A       9/2016
(Continued)

OTHER PUBLICATIONS

European Search Report issued in the corresponding European Patent Application No. 23743124.2; dated Dec. 19, 2024 (total 10 pages).
(Continued)

*Primary Examiner* — Umar Cheema
*Assistant Examiner* — Adam A Cooney
(74) *Attorney, Agent, or Firm* — Harness, Dickey & Pierce, P.L.C.

(57) ABSTRACT

An information processing system is provided. This information processing system includes: a controller; and a memory. The controller accepts a transmission request for transmitting a file stored in the memory. The controller acquires a first timestamp based on the file when accepting the transmission request. The first timestamp includes a first hash value which is a random letter string acquired from the file. The controller allows the memory to store the first timestamp to be linked with the file, and transmits the file to a destination that has sent the transmission request.

18 Claims, 12 Drawing Sheets

(56)        References Cited

U.S. PATENT DOCUMENTS

| | | | |
|---|---|---|---|
| 2005/0102499 A1 | 5/2005 | Kosuga et al. | |
| 2012/0109969 A1 | 5/2012 | Gil et al. | |
| 2014/0068458 A1* | 3/2014 | Kim ........................ | H04L 51/08 |
| | | | 715/752 |
| 2015/0180833 A1 | 6/2015 | Snow et al. | |
| 2018/0246933 A1* | 8/2018 | Darrow ................. | G06F 16/252 |
| 2020/0045001 A1* | 2/2020 | Mathur ................... | G06F 16/13 |
| 2020/0169425 A1* | 5/2020 | Hofstee ................. | H04L 9/0861 |

FOREIGN PATENT DOCUMENTS

| | | | |
|---|---|---|---|
| JP | 2017-204040 A | 11/2017 | |
| JP | 2018-073348 A | 5/2018 | |
| JP | 2020-087264 A | 6/2020 | |

OTHER PUBLICATIONS

International Search Report of the International Searching Authority, issued in PCT/JP2023/000223, mailed Mar. 7, 2023; ISA/JP; (5 pages).

* cited by examiner

INFORMATION PROCESSING SYSTEM RECEIVING AND SENDING FILE WITH TIMESTAMP INCLUDING HASH VALUE

CROSS REFERENCE TO RELATED APPLICATIONS

This application is a 371 U.S. National Phase of International Application No. PCT/JP2023/000223, filed on Jan. 6, 2023, which claims priority to Japanese Patent Application No. 2022-007388, filed Jan. 20, 2022. The entire disclosures of the above applications are incorporated herein by reference.

BACKGROUND

This invention relates to an information processing system, an information processing method and an information processing program.

Related Art

Japanese Patent Publication 2018-073348 discloses a technique in which a service providing server issues and stores a timestamp token (TST) based on its received original file or the like.

Recently, techniques for acquiring timestamps when transmitting files from a server.

SUMMARY

According to an aspect of the present invention, an information processing system is provided. This information processing system includes: a controller; and a memory. The controller accepts a transmission request for transmitting a file stored in the memory. The controller acquires a first timestamp based on the file when accepting the transmission request. The first timestamp includes a first hash value which is a random letter string acquired from the file. The controller allows the memory to store the first timestamp to be linked with the file, and transmits the file to a destination that has sent the transmission request.

BRIEF DESCRIPTION OF THE DRAWINGS

FIG. 3 shows an example of a hardware configuration of a transmission client device 200.

FIG. 10 shows an example of the reception screen 700 while downloading attached files.

DETAILED DESCRIPTION

Embodiment of the present invention will be described below with reference to the drawings. Various features shown in the following embodiment can be combined with each other.

By the way, the program for realizing software used in this embodiment may be provided as a non-transitory computer-readable medium, may be provided to be downloadable from an external server, or may be provided so that the program can be started on an external computer to realize its functions on a client terminal (so-called cloud computing).

Also, the term "part" in the present embodiment may include, for example, hardware resources implemented by circuits in a broad sense, together with information processing of software which can be specifically realized by those hardware resources. In addition, although various types of information are handled in this embodiment, such information can be represented by physical values of signal values representing, for example, voltage and current, high and low signal values as a binary bit array consisting of 0 or 1, or quantum superposition (so-called quantum bits), and communication and computation can be performed on a circuit in a broad sense.

In addition, the circuit in a broad sense means a circuit realized by combining a circuit, circuitry, a processor, a memory and the like in at least appropriate combination. That is, such circuits include an application specific integrated circuit (ASIC), a programmable logic device (e.g., a simple programmable logic device (SPLD), a complex programmable logic device (CPLD), etc.), and an integrated circuit (IC), a field programmable gate array (FPGA) and the like.

Embodiment 1

1. System Configuration

Firstly, a system configuration of an information processing system 1000 of the present embodiment will be described with reference to FIG. 1.

Figure 1:
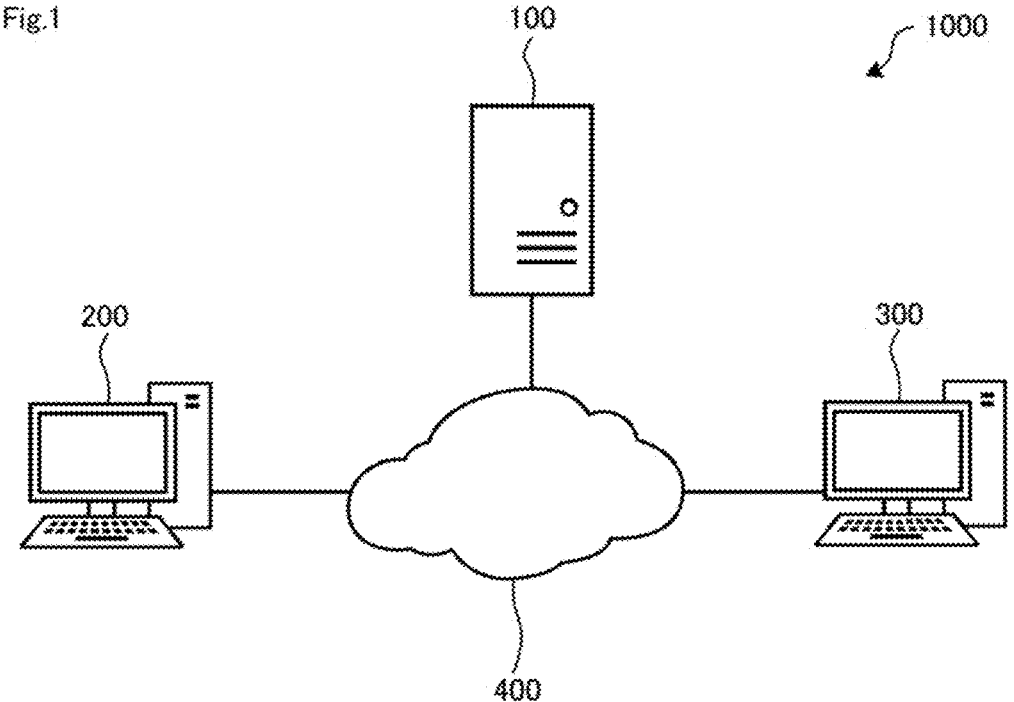
FIG. 1 shows an example of a system configuration of an information processing system 1000.

FIG. 1 shows an example of the system configuration of the information processing system 1000. As shown in FIG. 1, the information processing system 1000 includes a server device 100, a transmission client device 200, a reception client device 300 and a network 400. The server device 100 is configured to communicate with the transmission client device 200 and the reception client device 300 via the network 400. As a result, the server device 100, the transmission client device 200, and the reception client device 300 can mutually transmit or receive various information. Incidentally, the server device 100, the transmission client device 200 and the reception client device 300 are one example of information processing devices, and are not limited to this embodiment. That is, the server device 100, the transmission client device 200 and the reception client device 300 can be any of PCs (personal computers), tablet computers, smartphones and the like. Also, the server device 100, the transmission client device 200 and the reception client device 300 may be provided in plural. Herein, the system exemplified by the information processing system 1000 may be configured to include one or more devices or components. Therefore, the server device 100, the transmission client device 200 and the reception client device 300 are included in the system exemplified by the information processing system 1 even if they stand alone.

2. Hardware Configuration

Next, a hardware configuration of the server device 100, the transmission client device 200, and the reception client device 300 in the present embodiment is described with reference to FIGS. 2 to 4.

2.1 Hardware Configuration of Server Device 100

Figure 2:
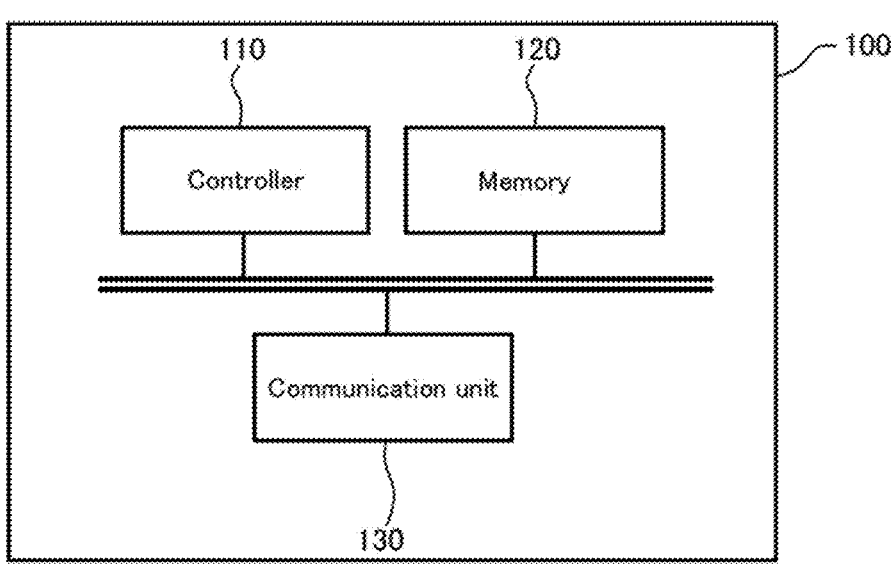
FIG. 2 shows an example of a hardware configuration of a server device 100.

FIG. 2 shows an example of a hardware configuration of the server device 100.

As shown in FIG. 2, the server device 100 includes: a controller 110; a memory 120; and a communication unit 130, and these components are electrically connected via a communication bus inside the server device 100. The server device 100 executes the processing according to the embodiment. Thereby, when the attached files are downloaded from the server device 100, time of transmitting the attached files from the server device 100 can be checked.

The controller 110 processes and controls overall operations related to the server device 100. The controller 110 is, for example, a central processing unit (CPU). The controller 110 reads out a predetermined program stored in the memory 120 and executes processing based on the program, whereby various functions according to the server device 100, for example, below-described processes shown in FIGS. 5 to 12 can be realized. Incidentally, the controller 110 is not limited to be a single unit, and the plural controllers 110 for respective functions may be included. Also, such controllers 110 may be included in combination.

The memory 120 stores various information defined by the above description. The memory 120 can store such information as a memory such as a random access memory (RAM) that stores temporarily necessary information (arguments, arrays, etc.) for program calculations, as a storage device such as a solid state drive (SSD) that stores various programs, etc. related to the server device 100, which are executed by the controller 110. The memory 120 stores various programs and variables related to the server device 100, which are executed by the controller 110, and data used by the controller 110 to execute the processing based on the programs. The memory 120 is an example of the storage medium.

The communication unit 130 is preferably a wire communication means such as USB, IEEE1394, Thunderbolt (registered trademark), wired LAN network communication, etc., but may also include wireless LAN network communication, mobile communication such as LTE/3G/4G/5G, Bluetooth (registered trademark) communication, and the like as necessary. More preferably, integration of these plural communication means is used. That is, the server device 100 may communicate various information from outside via the communication unit 130.

2.2 Hardware Configuration of Transmission Client Device 200

Figure 3:
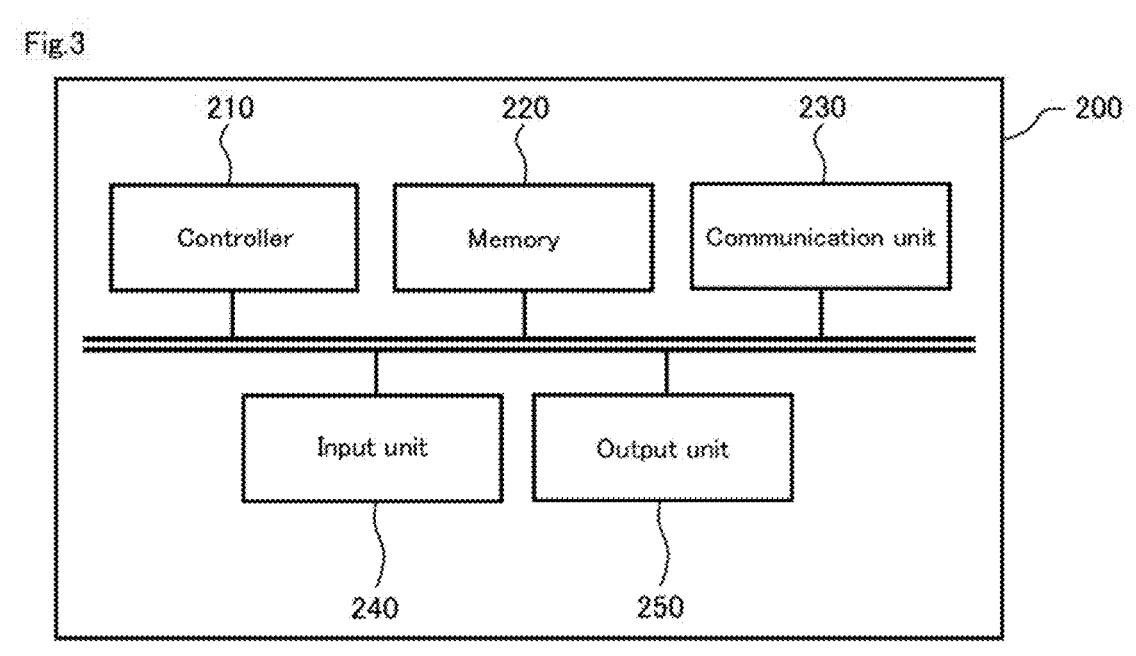

FIG. 3 shows an example of a hardware configuration of the transmission client device 200.

As shown in FIG. 3, the transmission client device 200 includes: a controller 210; a memory 220; a communication unit 230; an input unit 240; and an output unit 250, and these components are electrically connected via a communication bus inside the transmission client device 200. The transmission client device 200 executes the processing according to the embodiment. For the explanation of the controller 210, the memory 220 and communication unit 230 of the transmission client device 200, refer to the description of the controller 110, the memory 120 and the communication unit 130 of the server device 100.

The input unit 240 may be provided inside or outside a housing of the transmission client device 200. For example, the input unit 240 may be integrated with the output unit 250 and implemented as a touch panel. If the input unit 24 is a touch panel, a user can input tap operation, swipe operation and the like. Needless to say, a switch button, a mouse, a QWERTY keyboard or the like may be employed instead of a touch panel. Accordingly, the input unit 240 accepts an input based on the operation performed by the user. The input is sent as an instruction signal via the communication bus to the controller 210, and the controller 210 can execute predetermined control or calculation as necessary.

The output unit 250 can function as a display unit of the transmission client device 200. The output unit 250 may be provided inside or outside the housing of the transmission client device 200. The output unit 250 displays a screen of a graphical user interface (GUI) that can be operated by the user. This screen is preferably displayed by a display device, for example, a CRT display, a liquid crystal display, an organic EL display, a plasma display or the like depending on a type of the transmission client device 200.

2.3 Hardware Configuration of Reception Client Device 300

Figure 4:
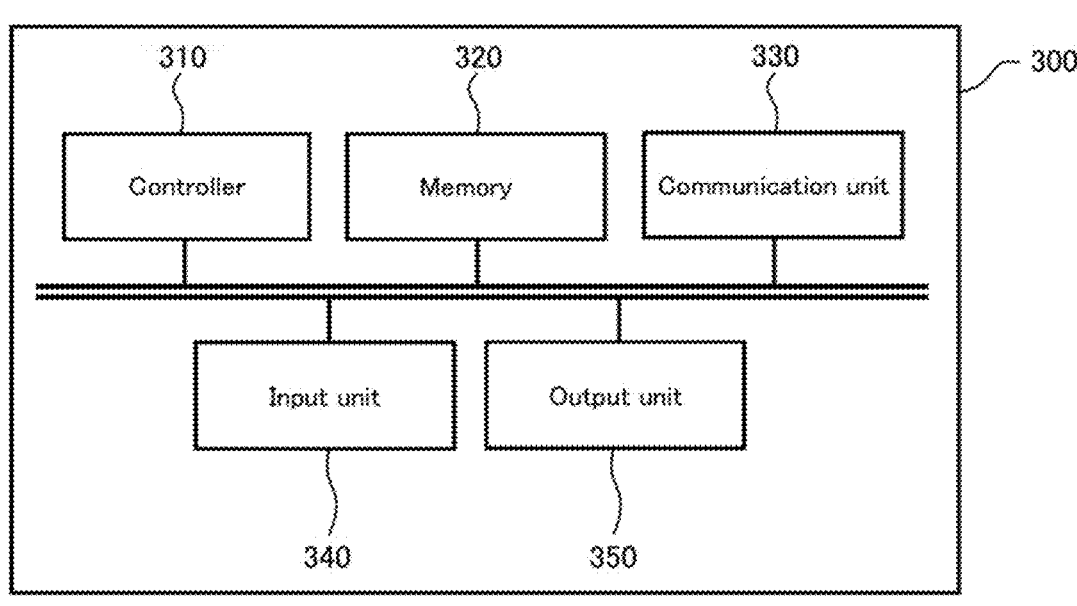
FIG. 4 shows an example of a hardware configuration of a reception client device 300.

FIG. 4 shows an example of the hardware configuration of the reception client device 300.

As shown in FIG. 4, the reception client device 300 includes: a controller 310; a memory 320; a communication unit 330; an input unit 340; and an output unit 350, and these components are electrically connected via a communication bus inside the reception client device 300. The reception client device 300 executes processing according to the embodiment. For the explanation of the controller 310, the memory 320, the communication unit 330, the input unit 340 and the output unit 350 of the reception client device 300, refer to the above description of the controller 110, memory 120 and communication unit 130 of the server device 100, and the input unit 240 and the output unit 250 of the transmission client device 200.

3. Information Processing Method

In this section, an example of using the information processing system 1000 will be described.

As the explanation of the information processing system 1000 of the present embodiment, an example of transmitting mail information and attached files attached to the mail information from the transmission client device 200 via the server device 100 to the reception client device 300 will be described.

3.1 Outline of Information Processing

Figure 5:
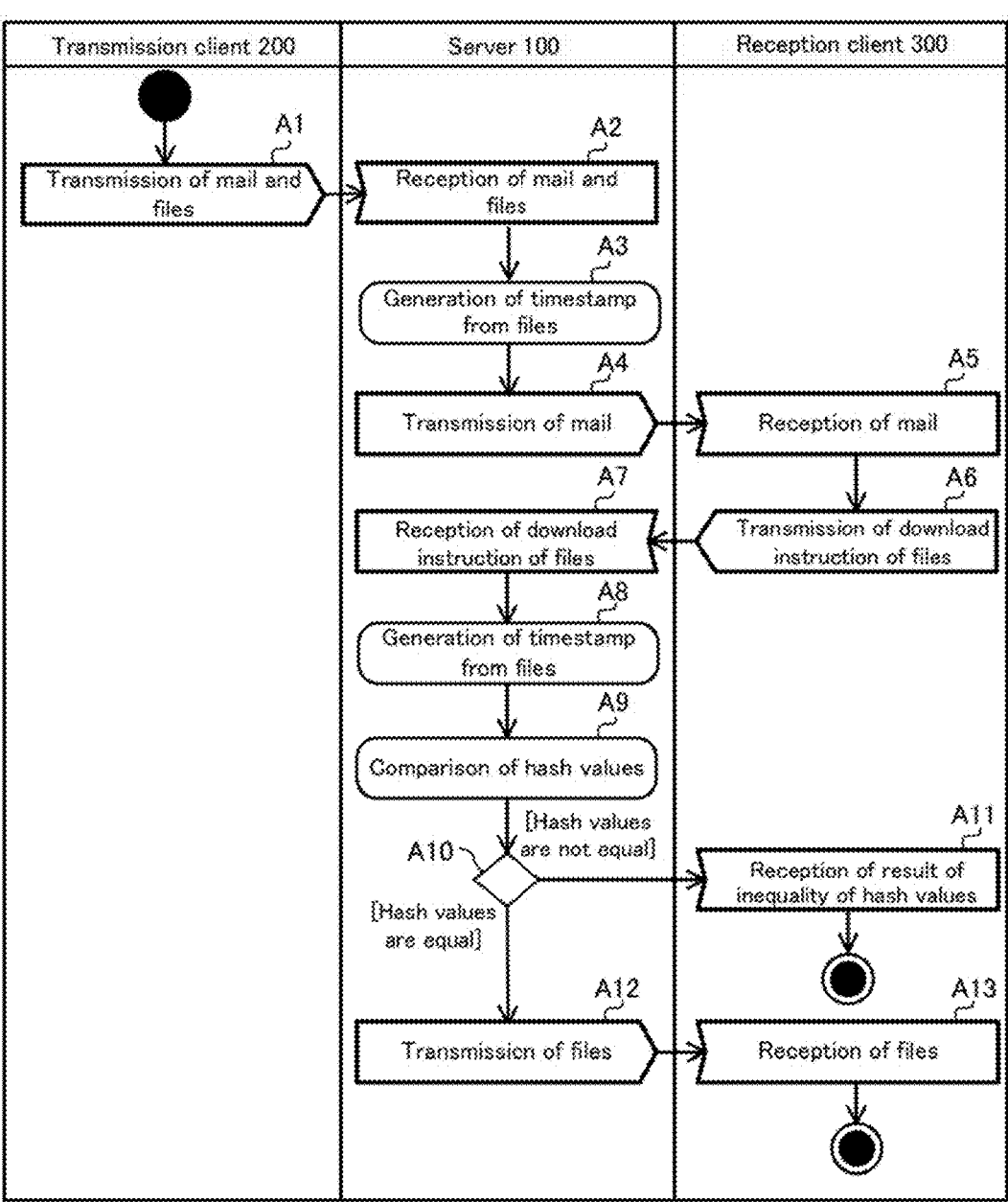
FIG. 5 is an activity diagram showing an example of information processing.

Next, an outline of the information processing will be described with reference to FIG. 5. FIG. 5 is an activity diagram that shows an example of the information processing.

In A1, the controller 210 of the transmission client device 200 accepts input of the mail information and the attached files via the input unit 240 of the transmission client device 200. After accepting the input of the mail information and the attached files, the controller 210 accepts a request to start transmission via the input unit 240. When accepting the request to start the transmission, the controller 210 transmits the mail information and the attached files via the communication unit 230 of the transmission client device 200 and the network 400 to the server device 100. Incidentally, the mail information includes information related to the mail, such as an address, a title and a main body of the mail. Further, in this specification, the attached files are files that are attached with text information of a mail and the like.

In A2, the controller 110 of the server device 100 acquires the mail information and the attached files from the transmission client device 200, which is a transmission source of the attached files, via the network 400 and the communication unit 130 of the server device 100. Further, at that time, the controller 110 of the server device 100 performs virus scan on the received mail information and the attached files.

In A3, when accepting the acquisition of the attached files, the controller 110 of the server device 100 allows the memory 120 of the server device 100 to store the mail information and the attached files. When allowing the memory 120 to store the attached files, the controller 110 generates a reception timestamp based on the attached files. This reception timestamp includes: a reception hash value which is a random letter string acquired from the attached files; and reception time information. At that time, the controller 110 allows the memory 120 to store the reception timestamp to be linked with the attached files. Herein, the reception timestamp is an example of the second timestamp, and the reception hash value is an example of the second hash value.

The timestamp secures credibility of electronic data by a combination of the time information and the hash value.

The time information is information indicating time of acquiring the timestamp. The reception time information may be information indicating time of acquiring the reception timestamp. For example, the reception time information may indicate any of: the time of accepting the file by the server device 100, the time when the server device 100 allows the memory 120 to store the file; the time for generating the timestamp; and the time of generating the timestamp. The transmission time information may be information indicating time of acquiring the transmission timestamp. For example, the transmission time information may indicate any of: the time of accepting the transmission request for transmitting the file stored in the memory 120; the time of transmitting the file to the destination that has sent the transmission request; the time for generating the transmission timestamp; and the time of generating the transmission timestamp.

A hash value is an irregular letter string generated from an original data by a specific algorithm. When such an algorithm used for a certain data is the same, the same hash value is to be obtained.

In A4, when accepting to store the reception timestamp, the controller 110 of the server device 100 transmits the mail information via the network 400 and the communication unit 130 of the server device 100 to the reception client device 300.

In A5, the controller 310 of the reception client device 300 receives the mail information via the network 400 and the controller 310 of the reception client device 300.

In A6, when accepting to receive the mail information, the controller 310 of the reception client device 300 accepts the input of the transmission request for transmitting the attached files via the input unit 340 of the reception client device 300. When accepting to receive the transmission request of transmitting the attached files, the controller 310 transmits the transmission request via the communication unit 330 of the reception client device 300 and the network 400 to the server device 100. The transmission request is information indicating a request for transmitting the attached files.

In A7, the controller 110 of the server device 100 receives the transmission request for transmitting the attached files stored in the memory 120 of the server device 100 from the reception client device 300 via the network 400 and the communication unit 130 of the server device 100. The controller 110 specifies the attached files subjected to the transmission request from the memory 120.

In A8, when accepting the transmission request, the controller 110 of the server device 100 generates a transmission timestamp based on the specified attached files. The transmission timestamp includes: a hash value which is a random letter string acquired from the attached files; and the transmission timestamp. The controller 110 allows the memory 120 of the server device 100 to store the transmission timestamp to be linked with the attached files. Herein, the transmission timestamp is an example of the first timestamp, and the transmission hash value is an example of the first hash value.

In A9, when generating the transmission timestamp related to the specified attached files, the controller 110 of the server device 100 compares the reception hash value included in the previously generated reception timestamp with the transmission hash value.

In A10, when the reception hash value included in the reception timestamp is not equal to the generated transmission hash value, the controller 110 of the server device 100 transmits the result of the inequality of the hash values via the communication unit 130 of the server device 100 and the network 400 to the reception client device 300, thereby proceeding to processing A11. Alternatively, when the reception hash value and the transmission hash value are equal in A10, the processing proceeds to A12.

In A11, the controller 310 of the reception client device 300 receives the result of the inequality of the hash values via the network 400 and the controller 310 of the reception client device 300. The controller 310 allows the output unit 350 of the reception client device 300 to display the result of the inequality of the hash values.

In A12, when accepting the equality of the hash values, the controller 110 of the server device 100 transmits the specified attached files to the reception client device 300 that has sent the transmission request. That is, the controller 110 transmits the attached files stored in the memory 120 to the reception client device 300 of the destination based on the transmission request.

In A13, the controller 310 of the reception client device 300 receives the attached files specified by the server device 100 via the network 400 and the communication unit 330 of the reception client device 300.

3.2 Details of Information Processing

Next, details of information processing executed by the server device 100, the transmission client device 200 and the reception client device 300 will be described with reference to FIGS. 6 to 12.

3.2.1 Processing of Display of Transmission Client Device 200

Figure 6:
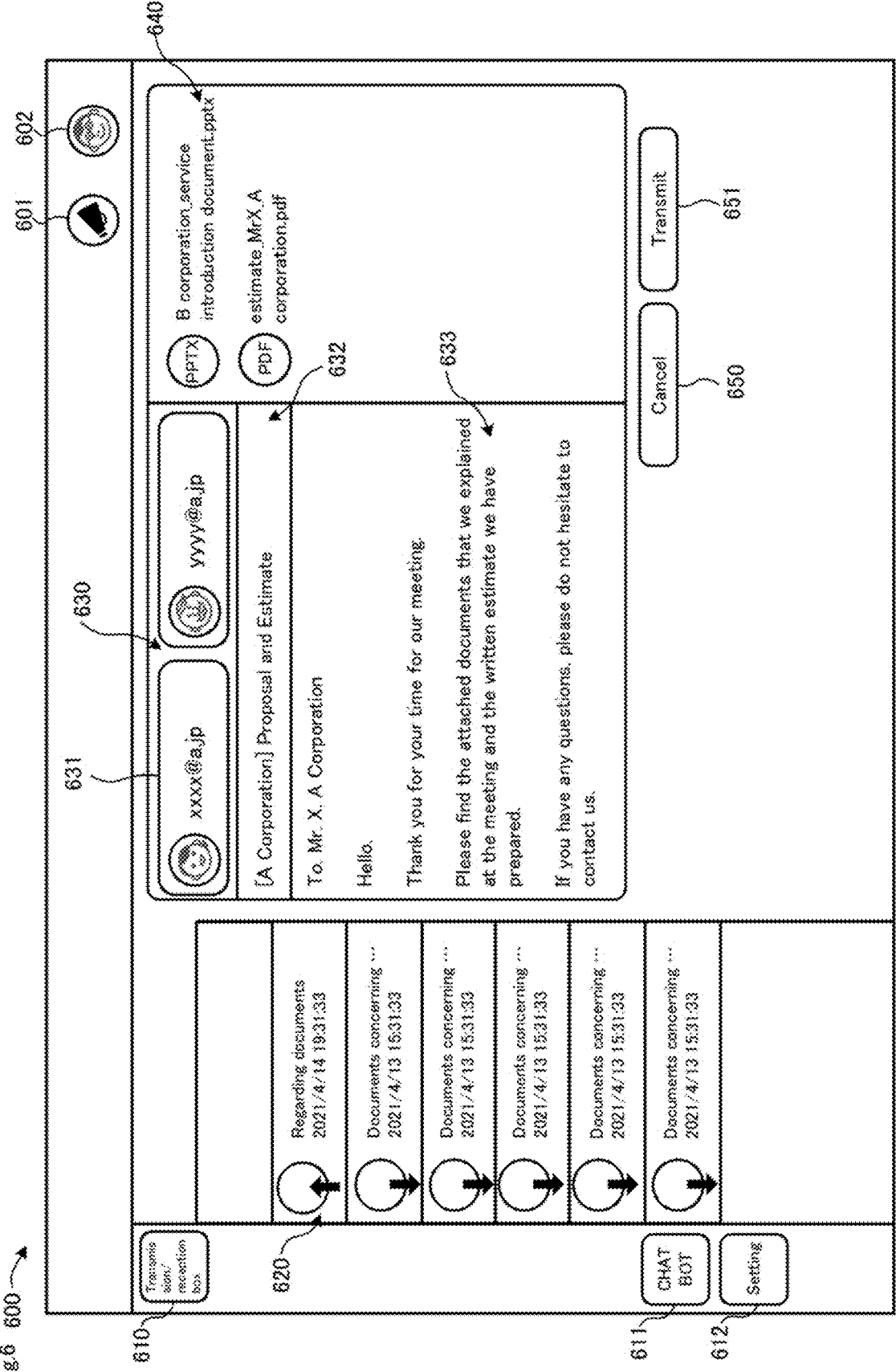
FIG. 6 shows an example of a transmission screen 600 before transmitting mail information and attached files.

Next, details of information processing will be described by way of an example of the transmission screen 600 displayed by the transmission client device 200 with reference to FIGS. 6 to 8. FIG. 6 shows an example of the transmission screen 600 before the transmission of the mail information and the attached files.

The transmission screen 600 is a screen displayed on the transmission client device 200 before transmitting the mail information and the attached files. The transmission screen 600 includes: the notification button 601; a transmitter icon button 602; a transmission/reception box button 610; a chatbot button 611; a setting button 612; a mail list display area 620; an address display area 630; a subject display area 632; a body display area 633; an attached file display area 640; a cancel button 650; and a transmission button 651.

The notification button 601 is a button for moving to a screen for notifying newly acquired information. Further, the transmitter icon button 602 is a button for moving to a screen for displaying and/or editing the transmitter's profile. Moreover, the transmission/reception box button 610 is a button for moving to a screen for displaying a list of the sent and/or received mail information. Furthermore, the chatbot button 611 is a button for calling a chatbot. Further, the setting button 612 is a button for moving to a setting screen. Furthermore, the mail list display area 620 is an area for displaying a list of the mail information stored in the transmission/reception box. The address display area 630 is an area for displaying information on the destination. The address display area 630 includes destination information 631 for specifying a recipient. The destination information 631 is information for specifying the destination such as a mail address of the destination and an icon related to the recipient of the destination. The subject display area 632 is an area for displaying a subject of each mail information. The body display area 633 is an area for displaying the body of the mail. The attached file display area 640 is an area for displaying the attached files attached to the mail information. The cancel button 650 is a button for deleting the mail information under preparation. The transmission button 651 is a button for transmitting the mail information and the attached files to the destination displayed in the address display area 630.

That is, the controller 210 of the transmission client device 200 accepts selection of any of the buttons on the transmission screen 600 via the input unit 240 of the transmission client device 200. When accepting the selection of any of the buttons, the controller 210 transmits the result of the selection of the button via the communication unit 230 of the transmission client device 200 and the network 400 to the server device 100. The controller 110 of the server device 100 accepts the selection of any of the buttons via the network 400 and the communication unit 130 of the server device 100, and thereby changes the information on the screen based on the kind of the selected button. The controller 110 transmits the changed screen information via the communication unit 130 and the network 400 to the transmission client device 200. The controller 210 receives the changed screen information from the server device 100 via the network 400 and the communication unit 230. The controller 210 allows the output unit 250 to display the changed screen information.

Herein, when the notification button 601 is selected, the controller 110 of the server device 100 allows to display the screen for notifying newly acquired information. Further, when the transmitter icon button 602 is selected, the controller 110 allows to display the screen for displaying and/or editing the transmitter's profile. Moreover, when the transmission/reception box button 610 is selected, the controller 110 allows to display the screen for displaying a list of the transmitted and/or received mail information. Furthermore, when the chatbot button 611 is selected, the controller 110 allows to display a screen for invoking a chatbot. Still further, when the setting button 612 is selected, the controller 110 allows to display the screen for editing the settings. Moreover, when the cancel button 650 is selected, the controller 110 deletes the all information displayed on the address display area 630, the subject display area 632, the body display area 633 and the attached file display area 640. When the transmission button 651 is selected, the controller 110 allows to display a screen for indicating that the mail information and the attached files have been sent to the destination displayed in the address display area 630. The processing according to the transmission button 651 will be described below with reference to FIGS. 7 and 8. Thereby, the user of the transmission client device 200 can use various functions.

Hereinafter, information processing after starting the transmission of the mail information will be described with reference to FIGS. 7 and 8. Each time when performing the processing of FIGS. 7 and 8, the output unit 250 of the transmission client device 200 displays latest screen information. That is, the controller 110 transmits the screen information via the communication unit 130 of the server device 100 and the network 400. The controller 210 of the transmission client device 200 receives the screen information via the network 400 and the communication unit 230 of the transmission client device 200. The controller 210 of the transmission client device 200 allows the output unit 250 of the transmission client device 200 to display the latest screen information. Thereby, the user of the transmission client device 200 can grasp the transmission status.

Figure 7:
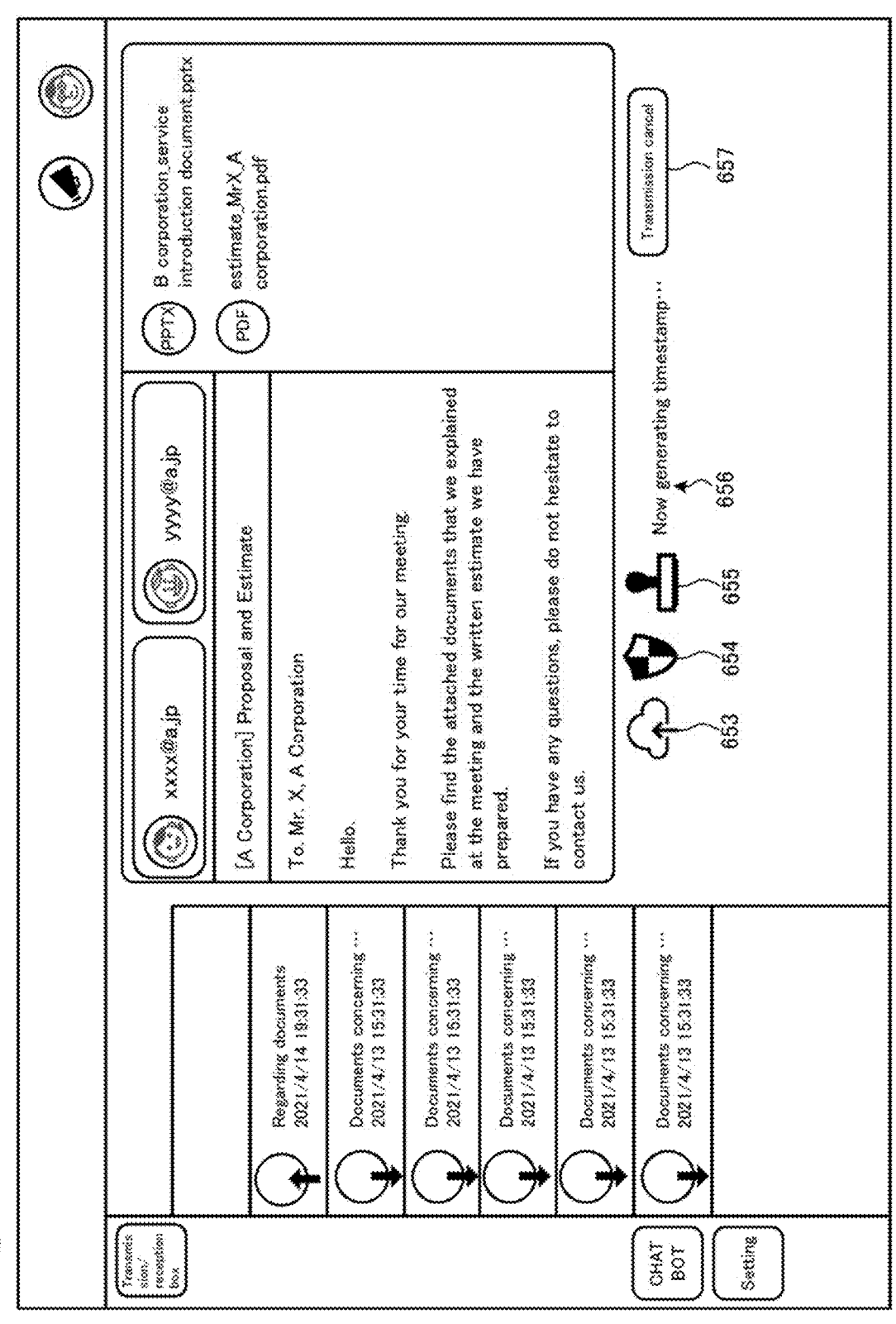
FIG. 7 shows an example of the transmission screen 600 while transmitting mail information and attached files.

FIG. 7 shows an example of the transmission screen 600 while transmitting the mail information and the attached files.

Compared to the transmission screen 600 of FIG. 6, the transmission screen 600 of FIG. 7 includes: an upload mark 653; a virus scan mark 654; a reception timestamp mark 655; a progress processing display area 656; and a transmission cancelling button 657.

The upload mark 653 is a mark displayed in response to start of uploading. Further, the virus scan mark 654 is a mark displayed in response to start of virus scanning. Moreover, the reception timestamp mark 655 is a mark displayed in response to start of generation of the reception timestamp. Also, the reception timestamp mark 655 may be configured to display the reception time information and the reception hash value. Still further, the progress processing display area 656 is an area for displaying that, during the uploading, the virus scanning and the generation of the reception timestamp, their processing is proceeding. Moreover, the transmission cancelling button 657 is a button for cancelling the upload of the mail information and the attached files.

When accepting the selection of the transmission button 651 shown in FIG. 6 from the transmission client device 200, the controller 110 of the server device 100 allows to display the upload mark 653 and the progress processing display area 656 for notifying "now uploading" therein. When the upload of the attached files is completed, the controller 110 hides the notice of "now uploading" of the progress processing display area 656. Subsequently, the controller 110 allows to display the virus scan mark 654 and the progress processing display area 656 for notifying "now virus-scanning" on a right side of the upload mark 653. When the virus scanning is completed, the controller 110 hides the notice of "now virus-scanning" of the progress processing display area 656. Subsequently, the controller 110 allows to display the reception timestamp mark 655 and the progress processing display area 656 for notifying "now generating timestamp" on a right side of the virus scan mark 654. When the generation of the reception timestamp is completed, the controller 110 hides the notice of "now generating timestamp". Thereby, the user of the transmission client device 200 can grasp the processing status of the attached files.

Figure 8:
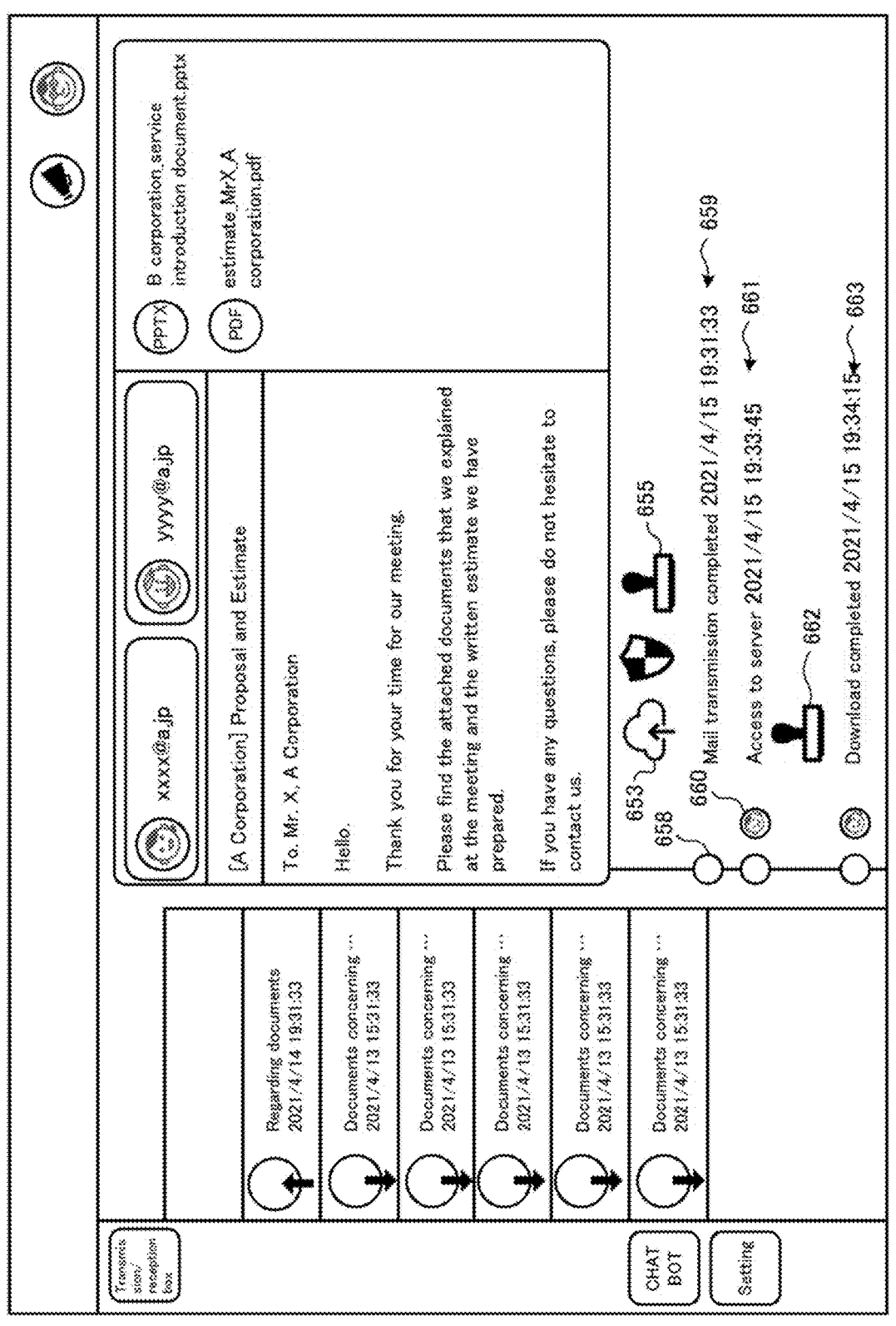
FIG. 8 shows an example of the transmission screen 600 after transmitting mail information and attached files.

FIG. 8 shows an example of the transmission screen 600 after transmitting the mail information and the attached files.

Compared to the transmission screen 600 of FIG. 7, the transmission screen 600 of FIG. 8 includes: a completion processing mark 658; a first processing display area 659; a completion recipient icon 660; a second processing display area 661; a transmission timestamp mark 662; and a third processing display area 663.

The completion processing mark 658 is a mark indicating that the processing has been completed. In addition, the first processing display area 659 is an area for displaying the completed processing. Moreover, the completion recipient icon 660 is an icon indicating the recipient who has completed the processing. The second processing display area 661 is an area for displaying the processing completed subsequently to that of the first processing display area 659. Further, the transmission timestamp mark 662 is a mark indicating that a timestamp was generated at the time of the reception. Moreover, the transmission timestamp mark 662 may be configured to display the transmission time information and the transmission hash value. Furthermore, the third processing display area 663 is an area for displaying the processing completed subsequently to that of the second processing display area 661.

That is, in FIG. 7, when the generation of the transmission timestamp for the attached files is completed, the controller 110 of the server device 100 transmits the mail information via the communication unit 130 of the server device 100 and the network 400 to the reception client device 300 of the destination. At that time, the controller 110 displays the first processing display area 659 for displaying "mail transmission completed" together with the completion processing mark 658 and the time of completing the transmission processing, below the reception timestamp mark 655. Subsequently, the controller 110 accepts access from the reception client device 300. When accepting the access from the reception client device 300, the controller 110 allows to display: a new completion processing mark 658; a completion recipient icon 660 for specifying the reception client device 300; and a second processing display area 661 for displaying "accessing to server" or the like, below the first processing display area 659.

Further, the controller 110 accepts the transmission request for transmitting the attached files from the reception client device 300. When accepting the transmission request, the controller 110 generates a transmission timestamp based on the attached files and allows to display the transmission timestamp mark 662 below the second processing display area 661. That is, the controller 110 outputs the reception timestamp mark 655 indicating the acquisition of the reception timestamp, and thereafter allows to display the transmission timestamp mark 662 indicating the acquisition of the transmission timestamp below the reception timestamp mark 655 on the same transmission screen 600. Incidentally, allowing the output unit 350 of the reception client device 300 to display the timestamp is an example of the form of outputting the timestamp. That is, the controller 110 is required just to output the timestamp, and may output by allowing the memory 120 of the server device 100 or the memory 320 of the reception client device 300 to store the timestamp in a file format. Moreover, displaying the transmission timestamp mark 662 below the reception timestamp mark 655 is an example of the form of displaying in timeline. That is, as long as the timestamps are output in timeline, for example, the controller 110 may hide the transmission timestamp mark 662, and then display the reception timestamp mark 655. When accepting the completion of the generation of the transmission timestamp, the controller 110 transmits the attached files, which are subjected to the transmission request, via the communication unit 130 of the server device 100 and the network 400. When accepting the completion of the transmission, the controller 110 allows to display a new completion processing mark 658, a new completion recipient icon 660 specifying the reception client device 300 and a third processing display area 663 for indicating "download completed" etc., below the transmission timestamp mark 662. That is, the controller 110 outputs: the upload mark indicating that the attached files are stored in the memory 120; and the third processing display area 663 indicating the completion of the transmission of the attached files onto the same transmission screen 600 in timeline. Further, the controller 110 allows to display: the reception time information of the time when acquiring the reception timestamp; and the transmission time information of the time when acquiring the transmission timestamp. Thereby, the user of the transmission client device 200 can be aware that the download by the recipient has been completed.

Figure 9:
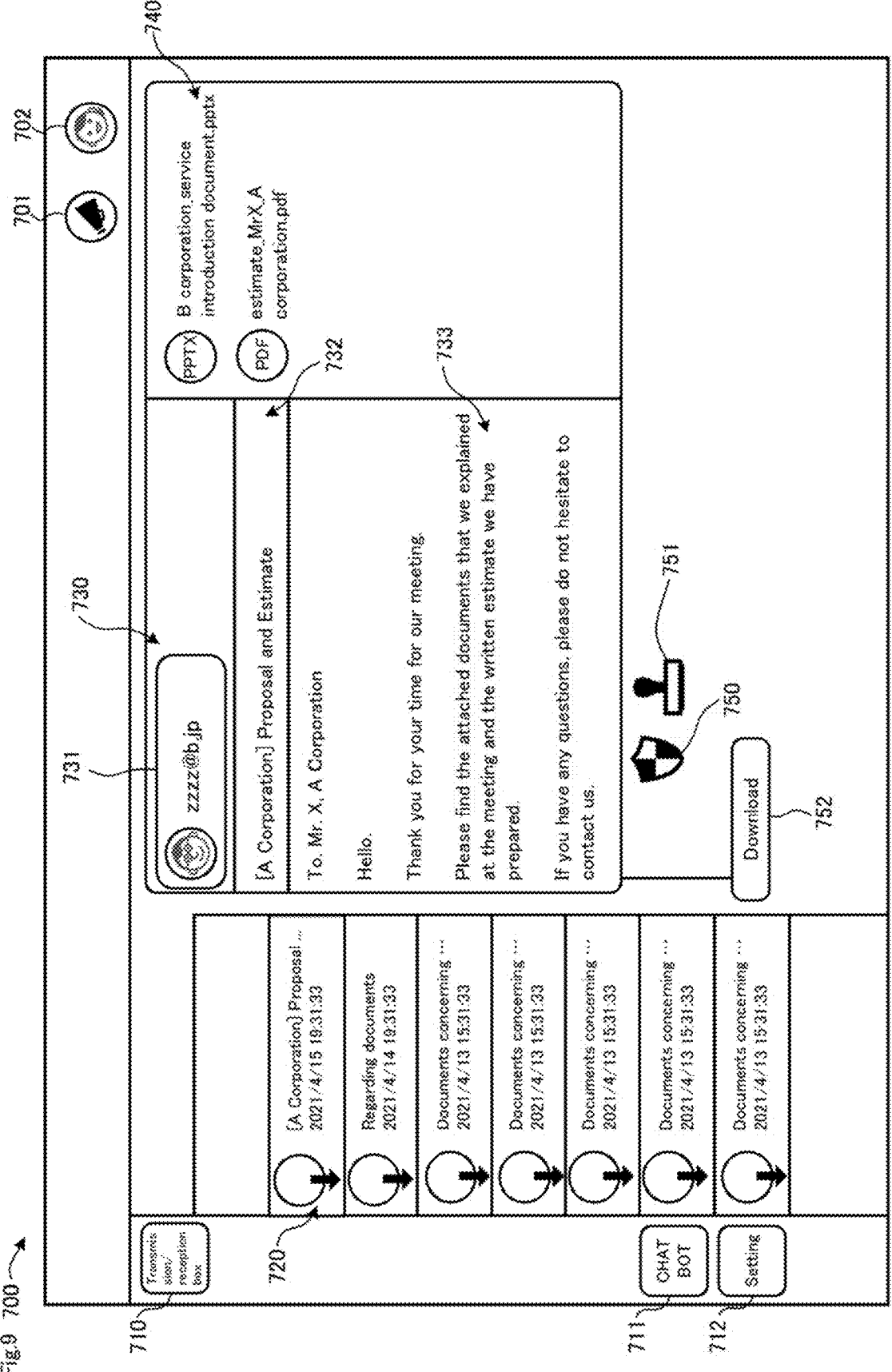
FIG. 9 shows an example of a reception screen 700 after receiving mail information and before downloading attached files.

Next, details of information processing will be described by way of an example of the reception screen 700 displayed on the reception client device 300, with reference to FIGS. 9 to 12. FIG. 9 shows an example of the reception screen 700 after receiving the mail information and before downloading the attached files.

The reception screen 700 is a screen displayed on the reception client device 300 when receiving the mail information and the attached files. The reception screen 700 includes: a notification button 701; a recipient icon button 702; a transmission/reception box button 710; a chatbot button 711; a setting button 712; a mail list display area 720; a transmission source display area 730; a subject display area 732; a body display area 733; an attached file display area 740; a virus scan mark 750; a reception timestamp mark 751; and a download button 752.

The notification button 701 is a button for moving to a screen for notifying newly acquired information. Further, the recipient icon button 702 is a button for moving to a screen for displaying and/or editing the recipient's profile. Furthermore, the transmission/reception box button 710 is a button for moving to a screen displaying a list of transmitted and/or received mail information. Moreover, the chatbot button 711 is a button for calling a chatbot. Still further, the setting button 712 is a button for moving to a setting screen. Further, the mail list display area 720 is an area for displaying a list of the mail information stored in the transmission/reception box. The transmission source display area 730 is an area for displaying information on the transmission source. The transmission source display area 730 includes the transmission source information 731 for specifying the recipient. The transmission source information 731 includes a mail address of the transmission source and an icon related to the transmitter of the transmission source. The subject display area 732 is an area for displaying a subject of each mail information. The body display area 733 is an area for displaying a body of the mail. The attached file display area 740 is an area for displaying the attached files attached to the mail information. The virus scan mark 750 is a mark indicating the completion of virus scanning of the mail information and the attached files. The reception timestamp mark 751 is a mark displayed in response to the start of the generation of the reception timestamp for the attached files. The reception timestamp mark 751 may be configured to display the reception time information and the reception hash value. The download button 752 is a button for transmitting the mail information and the attached files to the destination displayed in the address display area 630.

That is, the controller 110 of the server device 100 acquires the mail information together with the attached files from the transmission client device 200, which is the transmission source. The controller 110 transmits the screen information based on the acquired mail information and the attached files, via the communication unit 130 of the server device 100 and the network 400 to the reception client device 300. The controller 310 of the reception client device 300 accepts the screen information from the server device 100 via the network 400 and the communication unit 330 of the reception client device 300. When accepting the screen information, the controller 310 accepts selection of any of the buttons on the reception screen 700 via the input unit 340 of the reception client device 300. When accepting the selection of the button, the controller 310 transmits the result of the selection of the button via the communication unit 330 and the network 400 to the server device 100. The controller 110 accepts, via the network 400 and the communication unit 130, that any of the buttons on the reception screen 700 has been selected, and thereby changes the information on the screen based on the kind of the button selected. The controller 110 transmits the changed screen via the communication unit 130 and the network 400 to the reception client device 300. The controller 310 receives the changed screen from the server device 100 via the network 400 and the communication unit 330. The controller 310 allows the output unit 350 to display the changed screen.

Herein, when the notification button 701 is selected, the controller 110 of the server device 100 allows to display a screen for notifying the newly acquired information. When the recipient icon button 702 is selected, the controller 110 allows to display a screen for displaying and/or editing the profile of the recipient. Furthermore, when the transmission/reception box button 710 is selected, the controller 110 displays a screen for displaying the list of the transmitted and/or received mail information. Moreover, when the chatbot button 711 is selected, the controller 110 allows to display a screen for invoking a chatbot. Furthermore, when the setting button 712 is selected, the controller 110 allows to display a screen for editing the settings. Moreover, the download button 752 allows to display a screen for indicating the start of download of the attached files attached to the mail information. The processes according to the download button 752 will be described below with reference to FIGS. 10 to 12. Thereby, the user of the reception client device 300 can utilize various functions.

Figure 10:
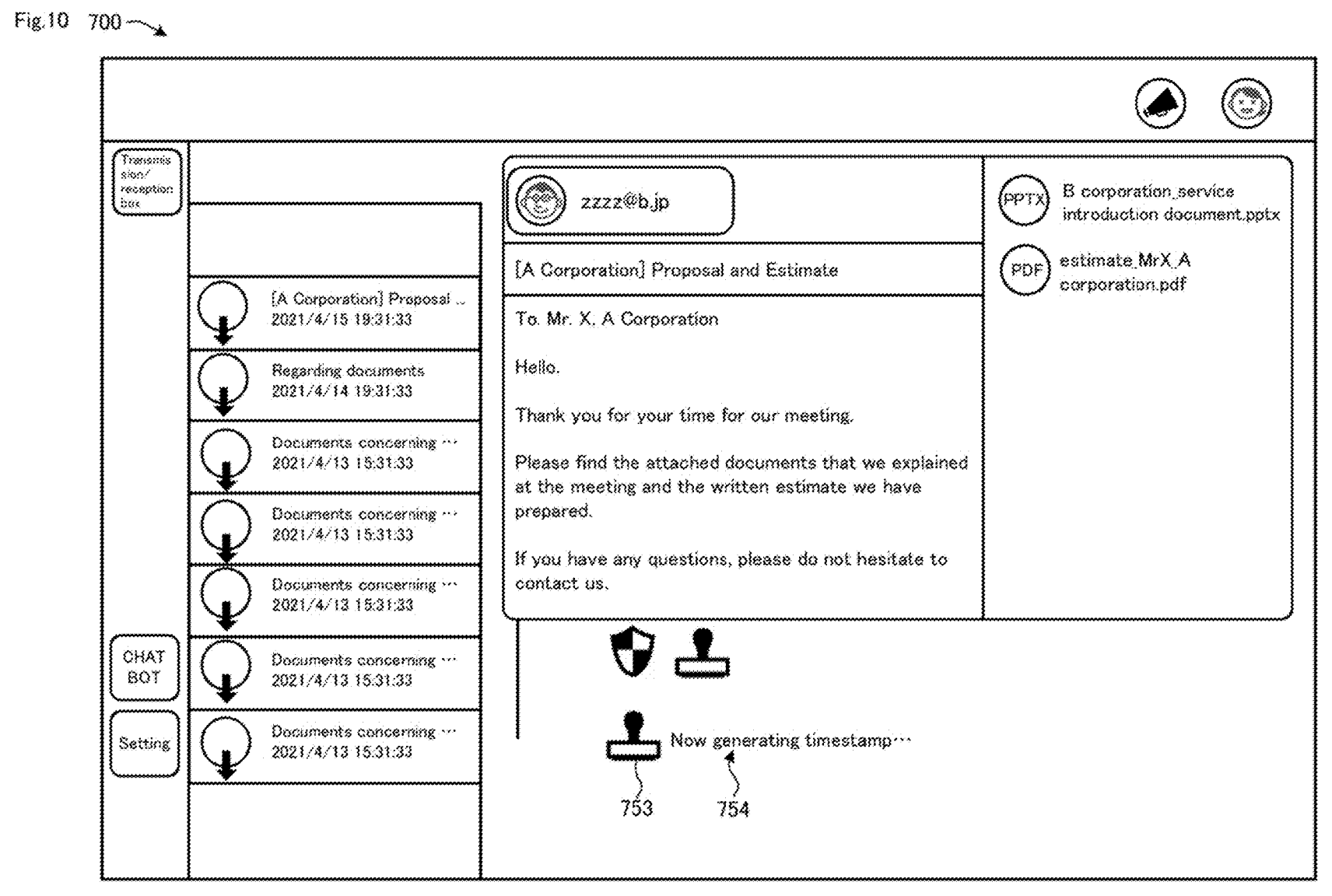
Figure 11:
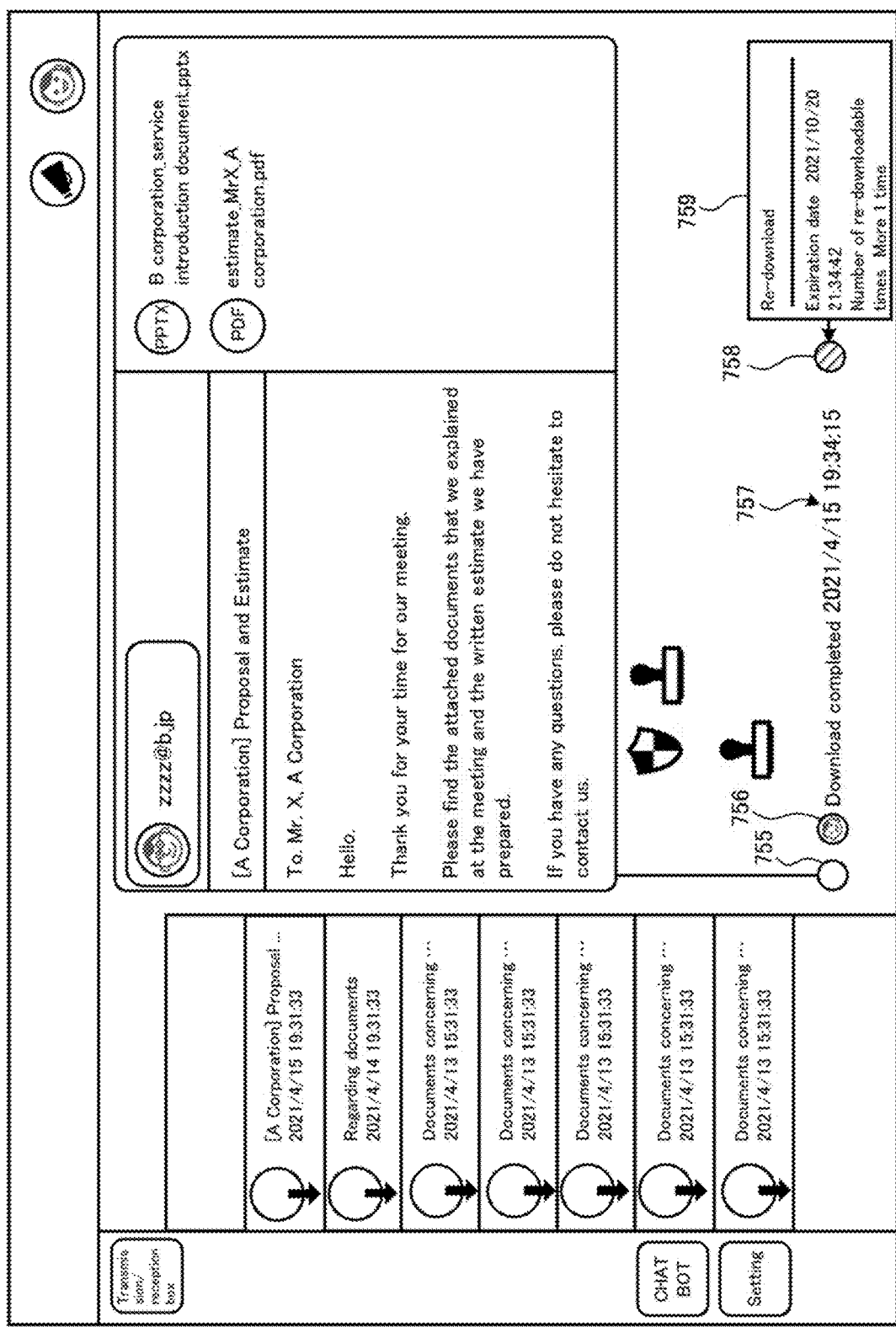
FIG. 11 shows an example of the reception screen 700 after downloading attached files.
Figure 12:
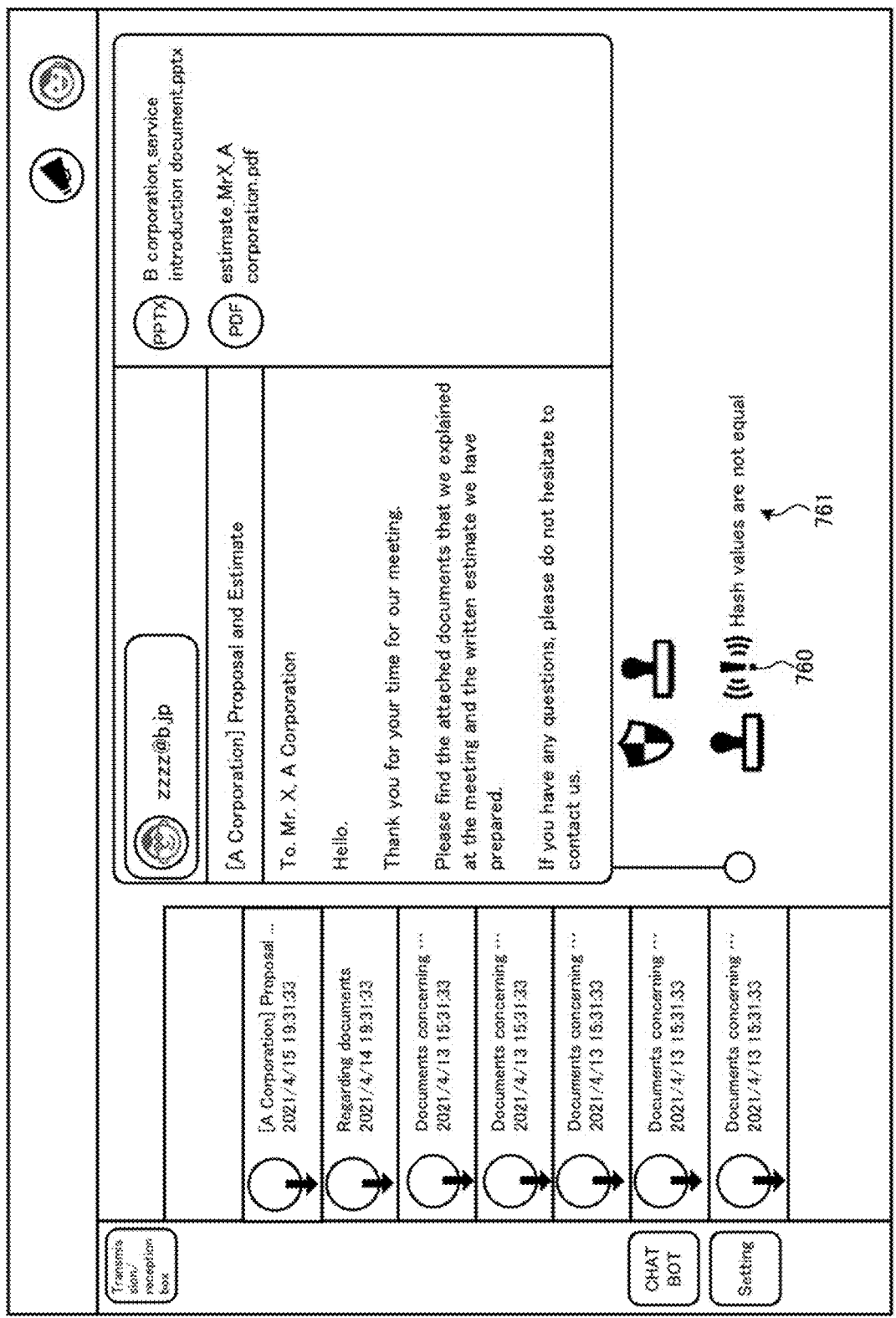
FIG. 12 shows an example of the reception screen 700 that is displayed when a transmission hash value of a transmission timestamp is different from a reception hash value.

Hereinafter, information processing after starting the download of the attached files will be described with reference to FIGS. 10 to 12. Each time when the processing of FIGS. 10 to 12 is performed, the output unit 350 of the reception client device 300 displays the latest screen information. That is, the controller 110 of the server device 100 transmits the screen information via the communication unit 130 of the server device 100 and network 400. The controller 310 of the reception client device 300 receives the screen information via the network 400 and the communication unit 330 of the reception client device 300. The controller 310 of the reception client device 300 allows the output unit 350 of the reception client device 300 to display the latest screen information. Thereby, the user of the reception client device 300 can grasp the download status.

FIG. 10 shows an example of the reception screen 700 while downloading the attached files.

Compared to the reception screen 700 of FIG. 9, the reception screen 700 of FIG. 10 includes: the transmission timestamp mark 753; and the progress processing display area 754. The transmission timestamp mark 753 is a mark displayed according to the start of the generation of the transmission timestamp. The transmission timestamp mark 753 may be configured to display the transmission time information and the transmission hash value. The progress processing display area 754 is an area for indicating that the above-described processing is proceeding while generating the transmission timestamp.

That is, when accepting the selection of the download button 752 shown in FIG. 9 from the reception client device 300, the controller 110 of the server device 100 allows to display the transmission timestamp mark 753 and the progress processing display area 754. When the generation of the transmission timestamp is completed, the controller 110 hides the indication of "now generating timestamp" in the progress processing display area 754. That is, the controller 110 displays the acquisition of the transmission timestamp onto the screen for displaying the mail information. In addition, the controller 110 allows to display: the reception time information on the time of acquiring the reception timestamp; and the transmission time information on the time of acquiring the transmission timestamp, followed by the processing shown by FIG. 11 or 12. Thereby, the user of the reception client device 300 can grasp the processing status of the attached files.

FIG. 11 shows an example of the reception screen 700 after downloading the attached files.

Compared to the reception screen 700 of FIG. 10, the reception screen 700 of FIG. 11 includes: a completion processing mark 755; a completion recipient icon 756; a processing display area 757; a re-download button 758; and a re-download information display area 759. The completion processing mark 755 is a mark indicating the completion of the processing. The completion recipient icon 756 is an icon indicating the recipient who completed the processing. The processing display area 757 is an area for displaying the completed processing. The re-download button 758 is a button for executing re-download of the attached files. The re-download information display area 759 is an area for displaying information related to the re-download, such as an expiration date of the re-download and the number of re-downloadable times.

That is, when completing the generation of the transmission timestamp, the controller 110 of the server device 100 allows to display: the completion processing mark 755; the completion recipient icon 756; and the processing display area 757. The controller 110 transmits the attached files via the communication unit 130 of the server device 100 and network 400 to the reception client device 300. The controller 310 of the reception client device 300 receives the attached files from the server device 100 via the network 400 and the communication unit 330 of the reception client device 300. When completing the transmission of the attached files to the reception client device 300, the controller 110 allows the processing display area 757 to display: an indication of "download completed" or the like; the re-download button 758; and the re-download information display area 759. Thereby, the user of the reception client device 300 can grasp the status of the download and the information related to the re-download.

FIG. 12 shows an example of the reception screen 700 displayed when the transmission hash value of the transmission timestamp is different from the reception hash value.

Compared to the reception screen 700 of FIG. 10, the reception screen 700 of FIG. 12 includes: a notification mark 760; and a notification display area 761. The notification mark 760 is a mark displayed when the transmission hash value of the transmission timestamp is different from the reception hash value. The notification display area 761 is an area for displaying a notice such as "the data may be changed from the time of upload" and "please receive the data again from the transmission client device 200", when the transmission hash value of the transmission timestamp is different from the reception hash value.

That is, when the transmission hash value included in the generated transmission timestamp is different from the hash value included in the reception timestamp generated when receiving the attached files, the controller 110 of the server device 100 allows to display the notification mark 760 and the notification display area 761. Herein, the notification mark 760 and the notification display area 761 are an example of an alert for indicating that the attached files have tampered possibility. That is, the alert for indicating that the attached files have the tampered possibility may be: a mark indicating that the attached files have the tampered possibility; or a letter string noticing that the attached files have the tampered possibility. The alert indicating that the attached files have the tampered possibility may be any alert that can indicate that the attached files have the tampered possibility. Incidentally, the notification mark 760 and the notification display area 761 may be displayed either when acquiring the transmission hash value or when generating the transmission timestamp. Thereby, the user of the reception client device 300 can grasp that the downloaded attached files are different from the uploaded files. In addition, when delivering the files via the server device 100, the user can check whether the server device 100 has retained the file properly or not.

According to the present embodiment described above, a timestamp can be acquired when transmitting a file from the server. According to the present embodiment, no complex information processing is required when acquiring the timestamp, thereby reducing the use of a cache memory of the server device 100. Further, due to the reduction of use of the cache memory, a large apparatus or computer is not needed, whereby the information processing can be executed at low cost.

Modified Example

The embodiment described above has provided the explanation that server device 100 generates the screens so as to allows the transmission client device 200 and the reception client device 300 to display the screen. However, the server device 100 transmits data for displaying the screens to the transmission client device 200 and the reception client device 300. The transmission client device 200 and the reception client device 300 may also generate and display the screens based on the data received from the server device 100.

Further, the above-mentioned embodiment has provided the explanation that the server device 100 mainly performs the processing. However, the transmission client device 200 and the reception client device 300 may be installed with applications respectively, and the transmission client device 200 and the reception client device 300 may be linked with the server device 100 to execute the above-described processing.

Incidentally, generating a timestamp by the server device 100 includes acquiring such a timestamp which is generated by another server device according to a request from the server device 100.

The present invention may be provided in the following forms.

(1) An information processing system, comprising: a controller; and a memory, wherein the controller accepts a transmission request for transmitting a file stored in the memory, acquires a first timestamp based on the file when accepting the transmission request, the first timestamp including a first hash value which is a random letter string acquired from the file, allows the memory to store the first timestamp to be linked with the file, and transmits the file to a destination that has sent the transmission request.

(2) The information processing system according to (1), wherein the controller receives the file from a transmission source of the file, allows the memory to store the file when receiving the file, and transmits the file stored in the memory to the destination based on the transmission request.

(3) The information processing system according to (2), wherein the controller acquires a second timestamp based on the file when allowing the memory to store the file, the second timestamp including a second hash value which is a random letter string acquired from the file, and allows the memory to store the second timestamp to be linked with the file.

(4) The information processing system according to (3), which displays: time of acquisition of the second timestamp; and time of acquisition of the first timestamp.

(5) The information processing system according to (3), wherein the controller outputs: the acquisition of the second timestamp; and the subsequent acquisition of the first timestamp in timeline order.

(6) The information processing system according to (4) or (5), which outputs an alert indicating that the file has a possibility of being tampered, when the first hash value and the second hash value do not match each other.

(7) The information processing system according to any one of (2) to (6), wherein the controller outputs: the storing of the file into the memory; and completion of the transmission of the file based on the transmission request in timeline order.

(8) The information processing system according to any one of (2) to (7), wherein the controller acquires: the file; and a mail attached with the file from the transmission source, and allows a display for displaying the mail to display the acquisition of the first timestamp.

(9) An information processing method executed by an information processing system, comprising respective processes executed by the controller of the information processing system according to any one of (1) to (8).

(10) A program for allowing a computer to function as the controller of the information processing system according to any one of (1) to (8).

The present invention is not limited to the above description.

Finally, various embodiments of the invention have been described, which are presented as examples and are not intended to limit the scope of the invention. Said novel embodiments can be implemented in various other forms, and various omissions, substitutions, and modifications can be made to the extent that they do not depart from the gist of the invention. Said embodiments and variations thereof are included in the scope or gist of the invention and within the scope of the invention and its equivalents described in the claims.

The invention claimed is:

1. An information processing system comprising:
a memory; and
a controller, the controller being configured to:
  receive mail information and a file from a transmission client, the mail information relating to a mail, the file being attached to the mail;
  cause the memory to store the mail information and the file;
  acquire a second timestamp based on the file when the file is stored into the memory, the second timestamp including a second hash value which is acquired from the file;
  cause the memory to store the second timestamp in association with the file;
  send the mail information stored in the memory to a reception client;
  accept a sending request for sending the file stored in the memory from the reception client;
  acquire a first timestamp based on the file when the sending request is accepted, the first timestamp including a first hash value which is acquired from the file;
  cause the memory to store the first timestamp in association with the file;
  compare between the first hash value and the second hash value to determine whether the first hash value matches the second hash value; and
  send the file to the reception client when the controller determines that the first hash value matches the second hash value.

2. The information processing system according to claim 1, wherein
the controller is further configured to cause a display to display a time at which the second timestamp is acquired and a time at which the first timestamp is acquired.

3. The information processing system according to claim 1, wherein
the controller is further configured to output the acquisition of the second timestamp and the subsequent acquisition of the first timestamp in this sequential order.

4. The information processing system according to claim 1, wherein
the controller is further configured to output an alert indicating that the file has a possibility of being tampered with when the controller determines that the first hash value and the second hash value do not match each other.

5. The information processing system according to claim 1, wherein
the controller is further configured to output the storing of the file into the memory and completion of the sending of the file to the reception client based on the sending request in this sequential order.

6. The information processing system according to claim 1, wherein
the controller is further configured to cause a display to display the mail and the acquisition of the first timestamp.

7. A non-transitory computer readable medium storing a program, wherein
the program is configured to cause a computer to function as the controller of the information processing system according to claim 1.

8. An information processing method for causing a controller to execute a process, the information processing method comprising executing on the controller the steps of:
receiving mail information and a file from a transmission client, the mail information relating to a mail, the file being attached to the mail;
causing a memory to store the mail information and the file;
acquiring a second timestamp based on the file when the file is stored into the memory, the second timestamp including a second hash value which is acquired from the file;
causing the memory to store the second timestamp in association with the file;
sending the mail information stored in the memory to a reception client;
accepting a sending request for sending the file stored in the memory from the reception client;
acquiring a first timestamp based on the file when the sending request is accepted, the first timestamp including a first hash value which is acquired from the file;
causing the memory to store the first timestamp in association with the file;
comparing between the first hash value and the second hash value to determine whether the first hash value matches the second hash value; and
sending the file to the reception client when the controller determines that the first hash value matches the second hash value.

9. The information processing method according to claim 6, further comprising:
displaying, on a display, a time at which the second timestamp is acquired and a time at which the first timestamp is acquired.

10. The information processing method according to claim 8, further comprising:
providing the acquisition of the second timestamp and the subsequent acquisition of the first timestamp in this sequential order.

11. The information processing method according to claim 8, further comprising: providing an alert indicating that the file has a possibility of being tampered with when the controller determines that the first hash value and the second hash value do not match each other.

12. The information processing method according to claim 8, further comprising:
providing the storing of the file into the memory and completion of the sending of the file to the reception client based on the sending request in this sequential order.

13. The information processing method according to claim 8, further comprising:
causing a display to display the mail and the acquisition of the first timestamp.

14. An information processing system configured to receive and send a file between a transmission client and a reception client, the information processing system comprising:

a memory; and a controller, the controller being configured to:

acquire a second timestamp based on the file, which is received from the transmission client, when the file is stored into the memory, the second timestamp including a second hash value which is acquired from the file;

cause the memory to store the second timestamp in association with the file;

accept a sending request for sending the file stored in the memory from the reception client;

acquire a first timestamp based on the file when the sending request is accepted, the first timestamp including a first hash value which is acquired from the file;

cause the memory to store the first timestamp in association with the file;

cause a display to display a time at which the second timestamp is acquired and a time at which the first timestamp is acquired; and send the file to the reception client.

15. The information processing system according to claim 14, wherein the controller is further configured to cause the display to display a time at which the second timestamp is acquired and a time at which the first timestamp is acquired.

16. The information processing system according to claim 14, wherein the controller is further configured to output the acquisition of the second timestamp and the subsequent acquisition of the first timestamp in this sequential order.

17. The information processing system according to claim 14, wherein the controller is further configured to output an alert indicating that the file has a possibility of being tampered with when the controller determines that the first hash value and the second hash value do not match each other.

18. The information processing system according to claim 14, wherein the controller is further configured to output the storing of the file into the memory and completion of the sending of the file to the reception client based on the sending request in this sequential order.

* * * * *